Figure 1:
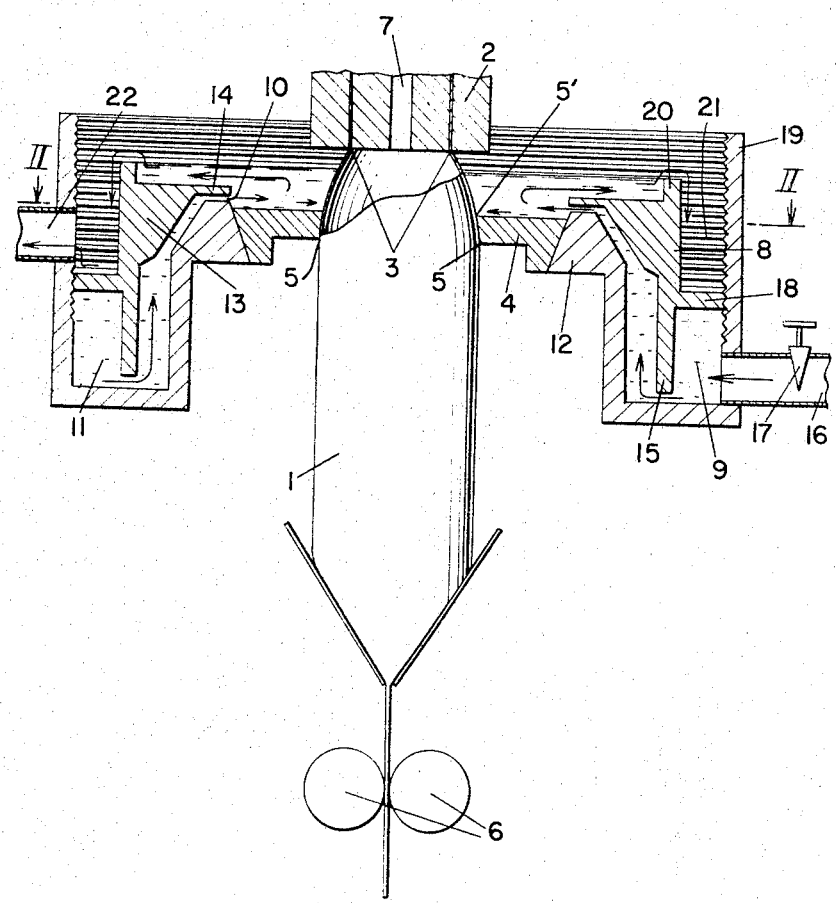

INVENTOR.
JUN TAGA

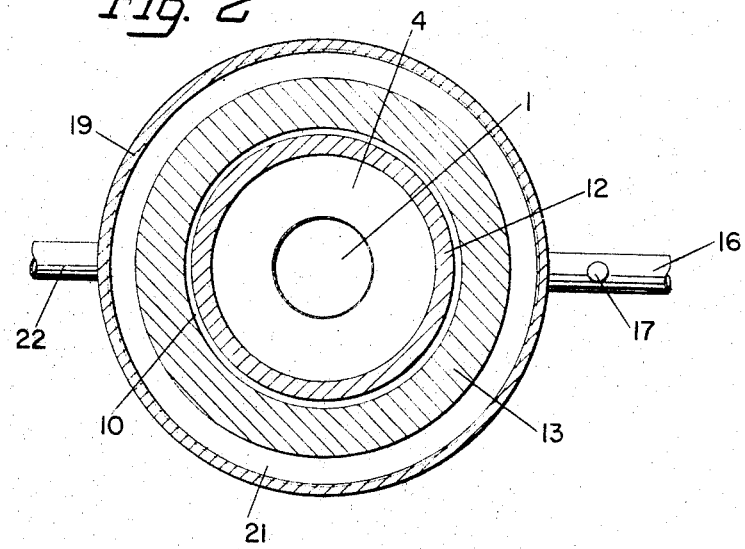
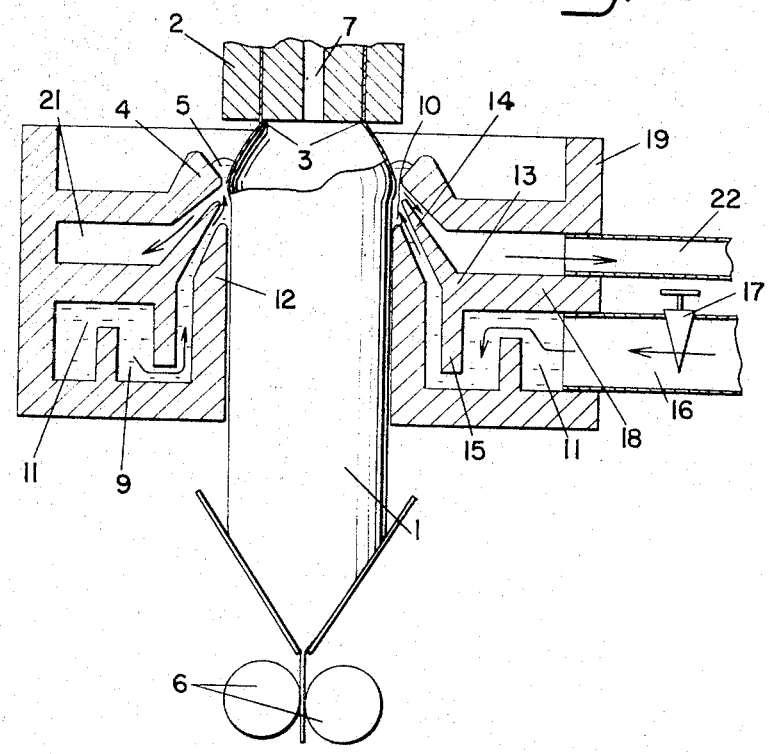

United States Patent Office 3,337,663
Patented Aug. 22, 1967

3,337,663
METHOD FOR PRODUCING THIN WALLED
TUBINGS OR TUBULAR OR FLAT FILMS
FROM THERMOPLASTIC MATERIALS, AND
AN APPARATUS THEREOF
Jun Taga, 5664 Ikuta, Kawasaki,
Kanagawa Prefecture, Japan
Filed Oct. 13, 1964, Ser. No. 403,550
Claims priority, application Japan, Oct. 22, 1963,
38/55,929; Nov. 17, 1963, 38/61,814
4 Claims. (Cl. 264—89)

The present invention relates to a method of producing thin walled tubing or tubular or flat films from thermoplastic materials, and an apparatus therefore.

More particularly, this invention relates to a novel method of quenching a tubing of thermoplastic materials which has been extruded from a die orifice of an extruder, subsequently inflated with a volume of gas supplied through an inlet provided in the extruder, and withdrawn downwardly in a substantially vertical direction from the extruder by means of nip rolls provided in the apparatus.

It has been known, in plastic molding industries, that quenching extruded articles in the molten state is indispensable for producing crystal-clear articles from thermoplastic materials such as polyethylene, polypropyrene, polyamide resin, polyvinilidene chloride and the like. In order to achieve this end, that is, to obtain an article formed with even and fine crystals and consequently having good properties such as transparency, various kinds of apparatus and methods of quenching has been developed. However, none of them could solve the demand satisfactorily.

For an example, in a known method of quenching, wherein an inflated tubing is passed through a passageway which is interiorly bathed by a downwardly flowing cooling liquid which contacts the whole of the external surface of the tubing as it passes through the passageway, the passageway can hardly be bathed uniformly over its interior walls because the inflated tubing is apt to get warped inside the passageway. Coincidently, in said method, undesirable friction is produced between the tubing and the passageway, resulting in making the withdrawal of the tubing from the passageway not smooth and consequently forming wrinkles or streaks on the film of the tubing.

In another conventional method wherein a tubing is quenched by quenching liquid falling in cataracts on and around the external surface of the tubing, the ripples which may form on the tubing prevent uniform quenching operations and produce irregularities on the film of the tubing.

In addition to those deficiencies, in conventional methods a number of differently sized cylindrical tubes which function as passageways of extruded semi-molten articles and also as molds, has to be provided for, since the diameter of the cylindrical tube in use has to be correspondent with that of the tubing under production, and the tube has to be replaced, if necessary, with much difficulty by another which matches with the tubing to be produced.

In the present invention, those deficiencies have been settled by employing a method comprising continuously extruding a molten thermoplastic material in tubular form, and continuously withdrawing the tubing downwardly in a substantially vertical direction from an extruder while maintaining within the tubing a volume of gas so that the degree of inflation and the rate of withdrawing the tubing bring about a reduction in thickness of the tubing, characterized in that the inflated tubing is withdrawn through an easily replaceable quenching disk provided beneath a die orifice of the extruder and having a circular opening in the center in such a way that the external surface of said tubing may closely contact with the circumferential lips of said circular opening, and in that a horizontally flowing or circulating continuous body of quenching liquid, the upper surface of which is kept substantially stagnant, stays over the quenching disk so that the tubing may pass through the liquid and be quenched effectively thereby.

Hence, it is an object of the present invention to provide a novel method for producing crystal-clear and thin walled tubing from thermoplastic materials by withdrawing an inflated tubing through the circular opening of an easily replaceable quenching disk provided beneath the die orifice of an extruder and covered with a horizontally flowing or circulating continuous body of quenching liquid, the surface of which is kept substantially stagnant.

It is another object of the invention to provide an apparatus which embodies the invention method.

Other objects will be apparent as the description of the invention proceeds on hereinafter.

In the accompanying drawings wherein preferable embodiments of the present invention are illustrated:

FIG. 1 is a diagrammatical vertical section view of the invention apparatus, particularly showing a quenching device thereof, wherein the quenching liquid staying over the surface of a quenching disk is made continuously fresh by making it to overflow over a bank, FIG. 2 is a plan view taken along the line II—II of FIG. 1, FIG. 3 is, similarly to FIG. 1, a diagrammatical vertical section view of another embodiment of the invention, wherein the surface of the quenching liquid which circumferentially contacts the external surface of the tubing, becomes swollen on account of surface tension caused thereabout.

Now referring to FIGS. 1 and 2, a molten thermoplastic material 1 in tubular form, hereinafter simply named as a tubing, is continuously extruded from an annular orifice 3 provided in a die 2 of an extruded (not shown) and continuously withdrawn downwardly in a substantially vertical direction from the extruder by nip rolls 6 and through a circular opening 5 of a quenching disk 4 provided beneath the die 2, while the tubing 1, inflated by a volume of gas supplied thereto from a gas inlet 7 provided in the center of said die 2, keeps close contact with the annular lips 5' of the circular opening 5. Though the quenching disk 4 is replaceably fitted to the inner walls 12 of the liquid supplying tank 11 in the present invention, experiments showed that it served for producing tubings of various diameters without replacing it with a different size disk.

Quenching liquid 9 is centripetally and continuously supplied over the quenching disk 4 from an annular slit opening 10 which is circumferentially provided along the inner walls 12 of the liquid supplying tank 11 and between the upper edge of said walls 12 and an inwardly extending flange 14 of an intake barrage 13 mounted on to the tank 11. Said intake barrage 13 is also provided with a downwardly projecting circular wall 15 which is submerged in the quenching liquid in the tank 11 and acts as a barrier to the ripples which may form in said tank when the liquid is supplied from an inlet liquid pipe 16 through a flow controlling cock 17. The intake barrage is further provided with an outwardly extending flange 18 which threadedly engages with an outer wall 19 of the liquid supplying tank 11 and forms an annular trench 21 together with an outer wall 8 of the intake barrage 13 and the outer wall 19 of the tank, for receiving the quenching liquid which flows over a bank or dam 20 projecting upwardly from the outer wall 8. The liquid which has flowed to the trench 21 is led to an outlet pipe 22.

In operating the present invention, the supply of the quenching liquid may be properly regulated by means of the flow controlling cock 17 and the intake barrage 13c which is threadedly engaged with the tank 11 so as to be raised or lowered, so that any breakage or deformation shall not be produced on the film of the tubing by the pressure of the liquid and said liquid can continuously flow or circulate over the quenching disk, being constantly replenished and yet kept substantially stagnant.

As an example, the method of the present invention was performed by means of the apparatus as described and illustrated in FIGS. 1 and 2, in the following manner. Polypropylene was extruded at 265° C. through an orifice of 100 mm. diameter of an extruder having a screw of 45 mm. diameter and running at 10 kg./hr. The haul-off speed was 165 cm. per minute. A quenching disk having a circular opening of 114 mm. diameter was used. A circular slit opening for supplying a quenching liquid over the quenching disk was 1 to 2 mm. high and the liquid supplied therefrom was 7.5 l./min. When the gas pressure inside a tubing was adjusted either to 4 mm. water or to 5 mm. water, the tubing slipped down through the circular opening of the quenching disk and irregularities were caused in the film of the tubing. Under the gas pressure of either 6 mm. water or 7 mm. water, the tubing did not slip down and no irregularities are produced on the films. The film of the tubing produced thereby had 0.03 mm. thickness and 180 mm. diameter when the tubing was pressed from opposite sides, and its turbidity was 3.1.

In FIG. 3, the quenching liquid is supplied upwardly along an external surface of a tubing 1 from a liquid supplying tank 11 through an annular slit opening 10, so that the surface of the quenching liquid being swollen due to the surface tension produced thereby and consequently kept substantially stagnant, may surround the external surface of the tubing at a position where the tubing initially contacts with the quenching device of the invention. The flow of liquid is shown by arrows as in FIG. 1, and the parts corresponding to those of FIG. 1 are indicated by the same reference numerals. While the present invention has been explained with reference to the accompanying drawings which illustrate preferable embodiments of the invention, it is to be noted that any modifications or alterations may be made within the spirit of the invention, the scope of which is appended hereinafter in the claims.

What is claimed:

1. A method of producing crystal-clear thin-walled tubing of thermoplastic material, comprising the steps of; extruding molten thermoplastic material downwardly through an annular die orifice to form tubing; drawing the tubing through an annular quenching disk beneath and substantially coaxial with the orifice; nipping the material beneath the quenchnig disk to close the tubing; supplying gas under pressure to the interior of the tubing above the nipped portion thereof to expand the tubing into contact with the quenching disk inner periphery; maintaining a constant depth and constantly overflowing annular body of quenching liquid in contact with the exterior surface of the tubing above the quenching disk; continuously replenishing the quenching liquid, at a relatively low pressure, from beneath the upper surface of the annular body thereof to maintain the surface of the annular body smooth and non-turbulent to prevent formation of wrinkles and streaks in the surface of the tubing passing on contact with said annular body of quenching liquid; and directing the quenching liquid to flow radially inwardly from the periphery of the quenching disk and substantially parallel to the upper surface of the quenching disk.

2. A method, as claimed in claim 1, including the step of directing the quenching liquid to flow radially inwardly and upwardly into contact with the tubing to form an annular body of quenching liquid in contact with the exterior surface of the tubing and having a positive meniscus which is smooth and non-turbulent.

3. Apparatus, for producing crystal-clear thin-walled tubing of thermoplastic material, comprising, in combination, an extrusion die having an annular orifice with an upwardly extending axis, for extrusion of molten thermoplastic material downwardly through the annular orifice to form tubing; withdrawing means operable to nip the tubing below said annular orifice to draw the tubing downwardly; an annular quenching disk having a central circular opening disposed between said extrusion die and said withdrawing means for passage of the tubing through said central circular opening in contact with the inner periphery of said quenching disk; said extrusion die being formed with a central passage substantially coaxial with said annular orifice for supplying of gas under pressure to the interior of the tubing above the nipped portion thereof to expand the tubing into contact with the inner periphery of said quenching disk; said quenching disk being formed with an upwardly extending dam means extending circuferentially thereof to define an annular space for containing a constant depth and constantly overflowing annular body of quenching liquid in contact with the exterior surface of the tubing above the quenching disk, the annular body of quenching liquid continuously overflowing over said dam means; means, including an annular nozzle substantially concentric with said quenching disk and having a narrow discharge orifice, operable to direct quenching liquid from a supply thereof centripetally and continuously of said space, at a relatively low pressure, beneath the surface of the annular body of liquid in said space to maintain the surface of the annular body of liquid smooth and non-turbulent; a supply of quenching liquid connected to said annular nozzle; and flow controlling means controlling the supply of quenching liquid to said annular nozzle; said annular nozzle directing the quenching liquid to flow radially inwardly from the periphery of said quenching disk and substantially parallel to the upper surface of said quenching disk.

4. Apparatus, for producing crystal-clear thin-walled tubing of thermoplastic material, comprising, in combination, an extrusion die having an annular orifice with an upwardly extending axis, for extrusion of molten thermoplastic material downwardly through the annular orifice to form tubing; withdrawing means operable to nip the tubing below said annular orifice to draw the tubing downwardly; an annular quenching disk having a central circular opening disposed between said extrusion die and said withdrawing means for passage of the tubing through said central circular opening in contact with the inner periphery of said quenching disk; said extrusion die being formed with a central passage substantially coaxial with said annular orifice for supplying of gas under pressure to the interior of the tubing above the nipped portion thereof to expand the tubing into contact with the inner periphery of said quenching disk; said quenching disk being formed with an upwardly extending dam means extending circumferentially thereof to define an annular space for containing a constant depth and constantly overflowing annular body of quenching liquid in contact with the exterior surface of the tubing above the quenching disk, the annular body of quenching liquid continuously overflowing over said dam means; means, including an annular nozzle substantially concentric with said quenching disk and having a narrow discharge orifice, operable to direct quenching liquid from a supply thereof centripetally and continuously of said space, at a relatively low pressure, beneath the surface of the annular body of liquid in said space to maintain the surface of the annular body of liquid smooth and non-turbulent; a supply of quenching liquid connected to said annular nozzle; and flow controlling means controlling the supply of quenching liquid to said annular nozzle; said annular nozzle directing the quenching liquid to flow radially inwardly from the periphery of said quenching disk and substantially parallel to the upper surface of said quenching disk, and directing the quenching liquid to flow radially inwardly and upwardly into contact with the tubing to form an annular body of quenching liquid in contact with the exterior surface of the tubing and having a positive meniscus which is smooth and non-turbulent.

References Cited

UNITED STATES PATENTS

| | | |
|---|---|---|
| 2,863,172 | 12/1958 | Buteux et al. |
| 2,955,321 | 10/1960 | Fortner et al. |
| 3,193,547 | 7/1965 | Schott _____ 264—209 |
| 3,207,823 | 9/1965 | Glyde et al. |

FOREIGN PATENTS

| | | |
|---|---|---|
| 853,745 | 11/1960 | Great Britain. |
| 903,661 | 8/1962 | Great Britain. |

ROBERT E. WHITE, *Primary Examiner.*

L. S. SQUIRES, A. R. NOE, *Assistant Examiners.*